Sept. 22, 1964   R. S. JOHNSON   3,149,926
ALTERNATING FLOW CATALYTIC CONVERTER

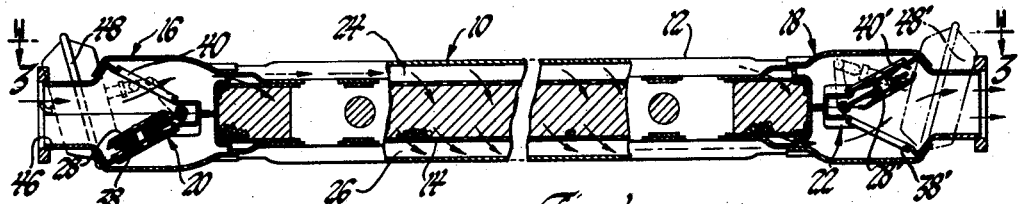

Filed Dec. 14, 1961                     2 Sheets-Sheet 2

INVENTOR.
Ralph S. Johnson
BY
Paul J. Beising
ATTORNEY

United States Patent Office 3,149,926
Patented Sept. 22, 1964

3,149,926
ALTERNATING FLOW CATALYTIC CONVERTER
Ralph S. Johnson, Rochester, Mich., assignor to General Motors Corporation, Detroit, Mich., a corporation of Delaware
Filed Dec. 14, 1961, Ser. No. 159,317
3 Claims. (Cl. 23—288)

The present invention relates to a catalytic converter of the type in which exhaust gas from an internal combustion engine is mixed with air and passed through a catalyst bed whereby the unburned hydrocarbons are converted to compounds of a less toxic nature.

One of the major problems associated with catalytic converters is that the catalyst particles lose their ability to remove toxic hydrocarbons after being subjected to exhaust gases for a period of time thereby periodically necessitating expensive and time consuming particle replacement. I believe that this decrease in activity of the catalyst can be attributed largely to the lead compounds found in the exhaust gases which causes a coating to be formed on the particles and thereby prevent intimate contact between the gases and particles.

A principal object of this invention is to provide an improved catalytic converter that prolongs the useful life of the catalyst particles by certain improvements in the routing of the gas flow through the converters.

The above and other objects are accomplished with a catalytic converter having control means which automatically reverse the direction of gas flow through the catalyst bed each time the engine is started. I have discovered that by reversing the gas flow through the bed, the active life of the catalyst particles is substantially increased. Although the exact reasons for this result are not known, it can probably be attributed to one or more of the following: (1) By reversing the flow, the lead accumulation is distributed on both the upper and lower surface of the bed so that no particles are severely coated, (2) when the gas flow is reversed, a "blow-out" effect results which causes particles of lead compound to be blown out of the bed, (3) the exit surface of the catalyst bed is always at the highest temperature and being that some lead compounds are known to be volatile, alternating the flow serves to heat and drive off some of the previously accumulated lead compounds.

Broadly stated, the converter in accordance with this invention, includes a catalyst bed disposed within a casing having inlet and outlet openings at the opposite ends thereof. Within the casing and adjacent the inlet and outlet opening, valving arrangements are provided that serve to direct the exhaust gas flow in alternate directions through the catalyst bed. Each valving arrangement includes an actuator which is adapted to be energized by an electric circuit having a reversing switch connected to the engine ignition switch. Upon each closing of the ignition switch, the reversing switch alternately energizes one of the actuators for positioning the associated valve for one direction of flow through the catalyst bed. In the event that the temperature of the bed exceeds a predetermined value, temperature sensing means are provided in the catalyst bed for de-energizing both actuators so that the valves are positioned to cause a bed by-pass gas flow.

A more complete understanding of the subject invention can be derived from the detailed description taken in conjunction with the drawings, in which:

FIGURE 1 is a sectional view of a catalytic converter incorporating the invention;

FIGURE 2 is an enlarged view of the gas inlet portion of the converter shown in FIGURE 1;

FIGURE 3 is an enlarged plan view with parts broken away of the mechanism disposed at the inlet and outlet ends of the converter;

Figure 4:
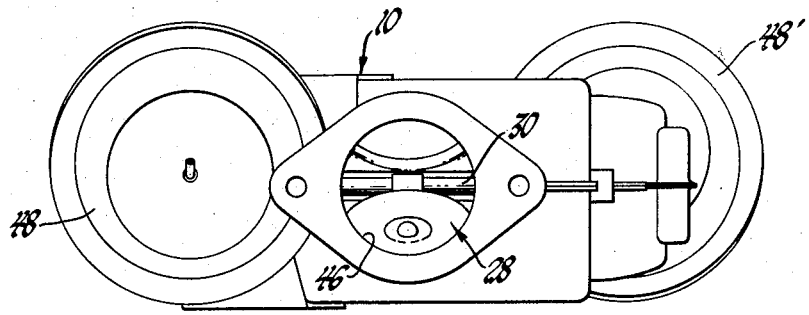
FIGURE 4 is a view taken on lines 4—4 of FIGURE 2.

Referring now to the drawings and particularly FIGURE 1, a converter is shown generally indicated by the numeral 10 and includes a casing 12 within which an elongated catalyst bed 14 is disposed. The casing 12 has an exhaust gas inlet portion 16 and a gas outlet portion 18 which respectively include valving arrangements 20 and 22. The catalyst bed 14 is mounted equidistant from the upper and lower walls of the casing 12 so as to define an upper gas flow chamber 24 and a lower gas flow chamber 26. Depending upon the position assumed by the valve arrangements 20 and 22, the gas flow may be alternately directed through the upper gas flow chamber 24, pass through catalyst bed 14 and exit via the lower gas flow chamber 26, or on the other hand, the gas flow may enter the lower gas flow chamber 26, pass through the catalyst bed and exit via upper gas flow chamber 24.

FIGURE 2 illustrates the valving arrangement incorporated with the gas inlet portion 16, and is shown comprising a pivoted valve member 28 supported on a pivot shaft 30 by a lever 32. A pair of disk-shaped members 34 are centrally mounted on the opposite ends of a pin 36 which passes through an aperture formed in the lever 32. Depending upon the position of the valve 28, the members 34 serve to close either a lower gas inlet port 38 or a upper gas inlet port 40 both of which are formed in a pair of plate members 42 and 44, respectively. The plate members are connected with the catalyst bed 14 at one end and terminate at the other end with a cylindrically shaped main gas flow inlet 46. With this arrangement and with the valve member 28 closing the inlet port 38 as shown in FIGURE 2, exhaust gas entering the main inlet 46 is directed through the port 40 to the upper gas flow chamber 24, however, upon closing port 40, the gas flow can be directed to the lower chamber 26. At this point, it should be noted that a similar valve arrangement having corresponding parts is located at the outlet portion 18 and includes a valve member 28' that is adapted to close an upper gas outlet port 40' and a lower gas outlet port 38' that respectively communicate with the upper and lower gas flow chambers 24 and 26.

Figure 5:
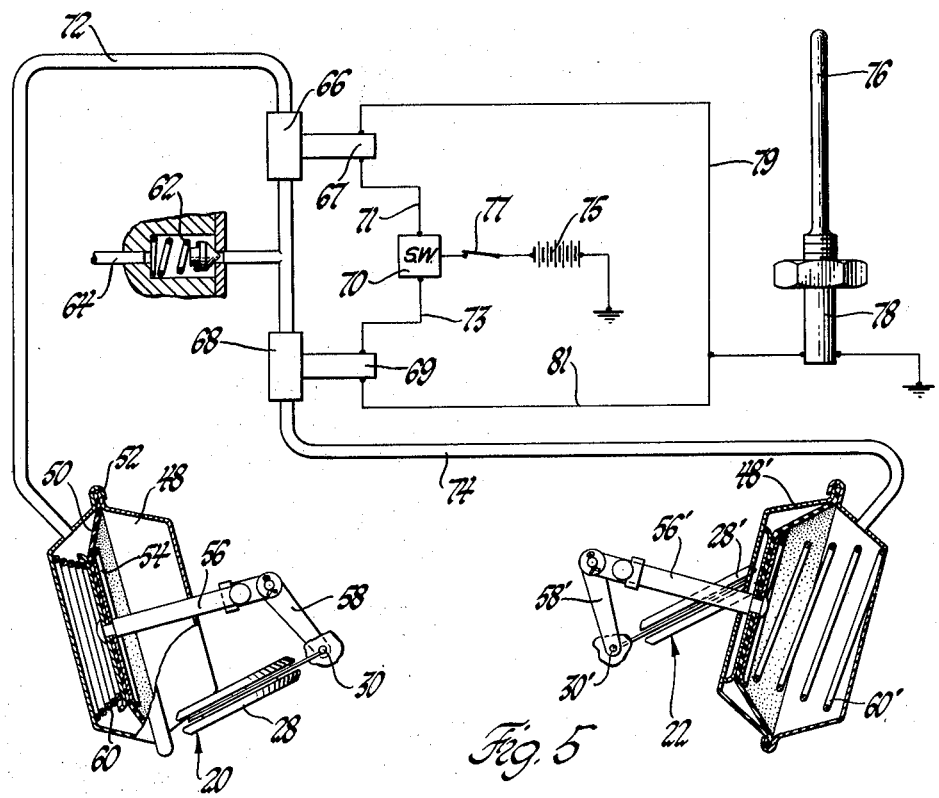
FIGURE 5 is the control circuit for the valving arrangement incorporated in the inlet and outlet portions of the converter.

Referring to FIGURES 1 and 3, fluid powered actuating motors 48 and 48' are mounted to the casing 12 at both the inlet portion 16 and outlet portion 18 of the converter, and are operatively connected to the respective valving arrangements 20 and 22 through appropriate linkage which will hereinafter be described. As best seen in FIGURE 5, each fluid motor comprises a conventional diaphragm 50 supported adjacent the periphery thereof by the crimped over portion 52 of the fluid motor housing. The diaphragm is connected through a pair of disk shaped plates 54 to a rod 56 that extends through the fluid motor housing and is pivotally connected to a crank arm 58. The crank arm, in turn, is rigidly fixed with the valve pivot shaft 30 for alternately positioning the valve member 28 in closing engagement with respect to the ports 38 and 40. In addition, the fluid motor includes a spring 60 for projecting the rod 56 to a fully extending position so as to close the upper port when the fluid motor is not connected with a source of vacuum, the latter position being illustrated by the motor 48' shown in FIGURE 5.

The control means for actuating the inlet and outlet valve arrangements is shown diagrammatically in FIGURE 5 and includes a check valve 62 that is connected with a source of vacuum, such as the manifold vacuum, through a passage 64. Vacuum pressure can be directed to either of the fluid lines 72 or 74 depending upon whether the respective valves 66 or 68 are opened by the associated solenoids 67 and 69. The energization of each of the solenoids is determined by a reversing switch, such as a conventional solenoid operative rotary stepping switch, which is connected to the solenoids 67 and 69 by the leads 71 and 73, respectively, and connected to a power source such as a battery 75 through an ignition switch 77. The reversing switch 70 automatically alternates the energization of the solenoids each time the ignition switch 77 is closed with the result that upon energization of the solenoid 67, for example, a vacuum is directed through the fluid line 72 to the inlet valve arrangement 20. Subsequent opening followed by closing of the ignition switch results in the energization of the solenoid 69 with vacuum communication being established between the source line 64 and the fluid motor 48' through the fluid line 74. The control circuit includes a probe member 76 that has a temperature responsive switch 78 connected by leads 79 and 81 to the respective solenoids 67 and 69 for controlling de-energization of the solenoids. The probe member 76 projects within the catalyst bed 14 for sensing the temperature thereof and prevents the bed temperature from reaching a destructive value as will hereinafter be explained.

During operation, assuming the ignition switch 77 is closed and reversing switch 70 energizes the solenoid 66, vacuum is then directed to the fluid motor 48 causing the diaphragm 50 to be drawn against the bias of spring 60. This movement shifts the rod 56 into the motor housing with resultant closing of the port 38 by the valve 28. The valving arrangement 22, not being connected to a source of vacuum, is under the influence of the associated spring 60' causing a projecting movement of the rod 56' relative to the motor housing accompanied by an upward pivotal movement of the valve member 28' so as to close the upper gas outlet port 40', as shown in FIGURE 1. In this position of the respective valving arrangements, the exhaust gas enters the main inlet pipe 46 and is directed through the upper inlet port 40 to the gas flow chamber 24, passes through the catalyst bed 14 in a downward direction, and exits by way of the gas flow chamber 26 and the lower gas outlet port 38. The gas flow through the catalytic converter 10 is maintained in this direction until such time when the ignition switch 77 is opened and subsequently closed again, as explained hereinbefore. At that time, the reversing switch 70 energizes the solenoid 68 causing the vacuum to be connected through the line 74 to the outlet fluid motor 48' with the respective valving arrangements 20 and 22 assuming positions so as to close the upper inlet port 40 with simultaneous operating of the lower inlet port 38, and closing of the lower outlet port 38' with simultaneous opening of the upper outlet port 40. Thereafter, the exhaust gases entering the main inlet pipe 46 flow through the lower inlet port 38 to the gas flow chamber 26, pass through catalyst bed 14 in an upward direction to the gas flow chamber 24, and exit therefrom through the upper outlet port 40'.

When an excessive temperature is sensed in the catalyst bed 14 by the probe member 76, the switch 78 serves to de-energize both of the solenoids 67 and 69 resulting in the associated valves 66 and 68 closing the lines 72 and 74 to prevent manifold vacuum from being directed to the fluid motors. The de-energization of the solenoids causes the respective springs 60 and 60' of the fluid motors 48 and 48' to pivotally move the valve members 28 and 28' in an upward direction closing respectively the upper inlet and outlet ports 40 and 40' so that the exhaust gases, taking the path of least resistance, flow directly through the gas flow chamber 26 without passing through the catalyst bed 14. This condition is maintained until such time when the temperature within the bed is lowered to a predetermined value that permits safe operation of the catalytic converter. It should be noted that this arrangement provides a "fail" safety feature which will permit the valve members 28 and 28' to automatically assume the by-pass position if the electric leads or vacuum lines are broken.

Various changes and modifications of the subject invention can be made without departing from the spirit of the invention. It should be understood that such changes and modifications are contemplated and that I do not intend to be limited except by the scope of the appended claims.

What is claimed is:

1. A catalytic converter comprising an elongated substantially flat casing having a main gas inlet and main gas outlet formed in the opposite end portions thereof, an elongated catalyst particle bed disposed in the casing and dividing the casing into vertically spaced first and second gas flow chambers, first and second gas inlet ports formed in the casing and connecting the main gas inlet respectively with said first and second gas flow chambers, first and second gas outlet ports formed in the casing and respectively connecting said first and second gas flow chambers with said main gas outlet, first and second valve means pivotally mounted in said casing to respectively coact with the inlet ports and outlet ports, a source of fluid, first and second fluid motors respectively connected with said first and second valve means for pivotally actuating same, a fluid circuit connecting said source of fluid with the fluid motors, solenoid operated valve means in said fluid circuit and interposed between the fluid source and the fluid motors, switch means for energizing said solenoid operated valve means, reversing means interposed between said switch means and said solenoid operated valve means so that fluid is alternately directed upon each closing of said switch means to one of said fluid motors to open and close appropriate ports to alternately direct gas flow from the first gas flow chambers through the bed and from the second gas flow chamber through the bed, and temperature responsive means connected to said solenoid operated valve means for de-energizing the latter to cause the gas to flow through the first gas flow chamber directly to the main outlet without passing through the catalyst bed whenever said bed temperature exceeds a predetermined value.

2. In combination, a catalytic converter having an elongated casing, a gas inlet opening and gas outlet opening formed in opposite end portions of said casing, a catalyst particle bed located in said casing so as to define spaced first and second gas flow chambers communicating with the gas inlet and gas outlet openings, first valve means located in said casing between the gas inlet opening and said gas flow chambers, second valve means located in said casing between the flow chambers and the gas outlet opening, a control system for moving said first and second valve means to positions whereby gas flow is alternately directed through the catalyst particle bed from the first gas flow chamber and exits through the second gas flow chamber and vice versa, said control system including temperature-responsive means for sensing excessive temperature of said bed, and means in said system and operatively associated with said temperature-responsive means for causing said valve means to assume positions whenever said excessive temperature is reached so that gas flow is directed from the gas inlet opening to the gas outlet opening through one of said gas flow chambers and passes over but not through the catalyst particle bed.

3. In combination, a catalytic converter having an elongated substantially flat casing, a gas inlet opening and a gas outlet opening formed in opposite end portions of said casing, an elongated perforated catalyst particle bed located in said casing for defining therewith spaced first and second gas flow chambers communicating with the gas inlet and gas outlet openings, a first valve member pivotally supported in said casing between the gas inlet opening and said gas flow chamber for opening and closing communication therebetween, a second valve member pivotally supported in said casing between the gas flow chambers and the gas outlet opening for opening and closing communication therebetween, a control system for moving said first and second valve members to positions whereby gas flow is alternately directed through the catalyst particle bed from the first gas flow chamber and exits through the second gas flow chamber and vice versa, said control system including temperature-responsive means for sensing excessive temperature of said bed, and means in said system and operatively associated with said temperature-responsive means for causing said valve members to assume positions whenever said excessive temperature is reached so that gas flow is directed from the gas inlet opening to the gas outlet opening through one of said gas flow chambers and passes over but not through the catalyst particle bed.

References Cited in the file of this patent

UNITED STATES PATENTS

| | | |
|---|---|---|
| 2,332,740 | Mott | Oct. 26, 1943 |
| 2,621,049 | Pottmeyer | Dec. 9, 1952 |
| 2,867,497 | Houdry et al. | Jan. 6, 1959 |
| 2,898,202 | Houdry et al. | Aug. 4, 1959 |
| 2,946,651 | Houdry | July 26, 1960 |
| 2,991,160 | Claussen | July 4, 1961 |
| 2,999,640 | Waterfill | Sept. 12, 1961 |
| 3,050,375 | Bloch | Aug. 21, 1962 |
| 3,053,773 | Calvert | Sept. 11, 1962 |
| 3,086,353 | Ridgway | Apr. 23, 1963 |
| 3,086,839 | Bloch | Apr. 23, 1963 |
| 3,090,677 | Scheitlin et al. | May 21, 1963 |